B. KRAFT.
Car Brake.
No. 8,899.
Patented Apr. 20, 1852.
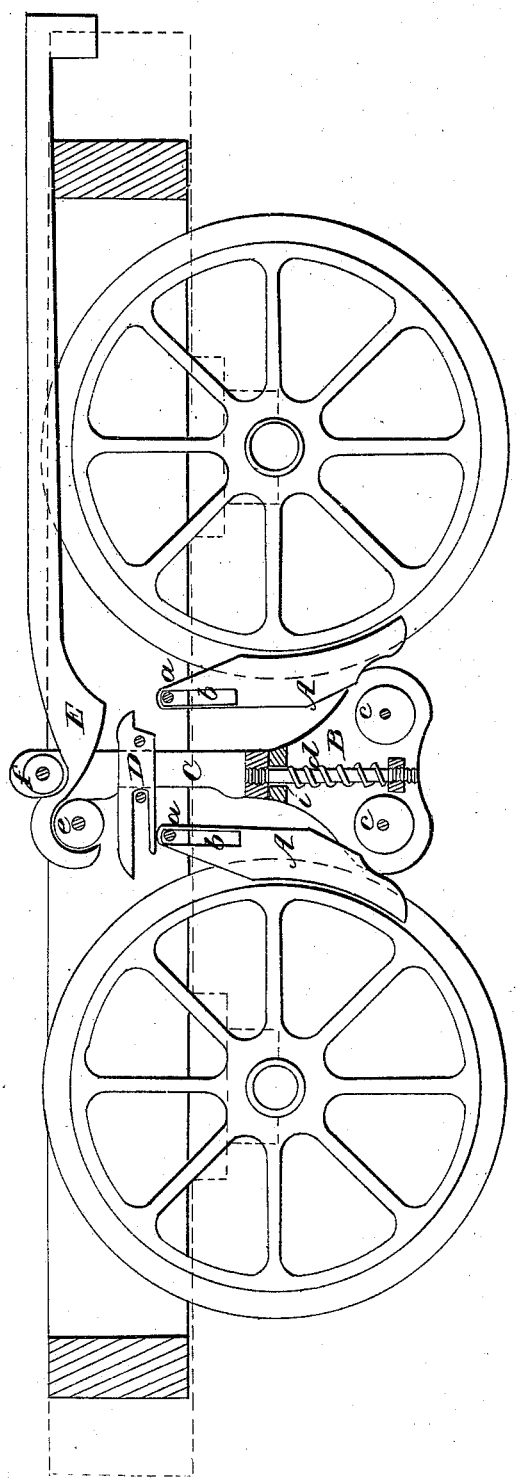

UNITED STATES PATENT OFFICE.

BENJ. KRAFT, OF READING, PENNSYLVANIA.

RAILROAD-CAR BRAKE.

Specification of Letters Patent No. 8,899, dated April 20, 1852.

*To all whom it may concern:*

Be it known that I, BENJAMIN KRAFT, of Reading, in Berks county, and State of Pennsylvania, have invented a new and useful Improvement in Railroad-Car Brakes; and I do hereby declare that the following is a full and exact description thereof, reference being had to the accompanying drawing and to letters of reference marked thereon.

To enable others to make and use my invention, I will proceed to describe its construction and operation.

The car or truck is to be constructed in the usual form and way, the drawing represents an elevation of one side of the truck with the outer bar of the frame removed, (it being shown by faint dotted red lines only,) between the wheels in the rear of one and advance of the other I suspend two rubbers A, A, on pins in the frame $a$, $a$, these rubbers having slots $b$, $b$, so that they may be allowed to rise, they are shaped on the back in a peculiar manner and may be described by a section of the common O G molding the lower part being convex answers to the O, the next upward being concave answers to the G surmounted by an inclined plane. Between these two rubbers I suspend a frame B, holding two rollers $c$, $c$, which when elevated form a wedge between the inclined planes on back of said rubbers pressing them with any degree of tightness against the wheels. This frame B is attached to a hanger one side of which is shown at C, by a counter pin $i$ on which is a spiral spring $d$, to counteract the sudden effect of tightening the rubbers on the wheels when in motion. I also provide a sliding block or bolt D, above the pins $a$, $a$, on which the rubbers are suspended which block is fitted so that it may be slid or set over either of the rubbers (to which it is designed to act as a check or stop to prevent the advance rubber, over which it is set, from being raised by the wheel) to suit the direction in which the car is running, (as shown in the drawing it is supposed that the car is running to the left) so that when the rollers $c$, $c$, come in contact with and between the rubbers they stop the revolution of both wheels, and when the car is backed in the slightest degree, the rear wheel carries with it, or raises the rubber on its periphery, and liberates the rollers $c$, $c$, which immediately drop into their original position at rest; $e$, is a roller in the frame of the truck and $f$, is a roller in the upper part of the hanger frame $c$ under the roller $f$ and over the roller $e$, is introduced a wedge E with a shaft extended to the end of the truck so that when it comes in contact with the carriage behind or before it, as the case may be, it is driven up and raising the hanger C, and frame B, with the rollers $c$, $c$, between the rubbers, presses them against the wheels, this may also be effected by hand levers or any other way to effect the same end, so as to be operated on by the conductor at will. When the truck is required to run in the opposite direction the block D is to be placed over the other rubber, whichever direction the carriage is intended to run the block D must be placed over the advance rubber.

I do not claim the mere application of friction rollers $c$, $c$, as such are not new, nor yet do I claim independent of the means and manner shown, the employment of a stop to prevent the advance rubber from being raised by the wheel, or, exclusively of itself, the adoption of a spring to reduce the shock; but What I do claim as my invention and desire to secure by Letters Patent is—

The combination and arrangement of the sliding bar E made as described and represented in Fig. 1 with the rollers $e$ $f$ and suspended frame B attached to a hanger C by a center pin $i$ on which is adjusted the spiral spring $d$, said frame being made, arranged, and operated in the manner and for the purpose herein set forth.

In testimony whereof I have hereunto signed my name before two subscribing witnesses.

BENJAMIN KRAFT.

Witnesses:
A. E. H. JOHNSON,
WM. M. SMITH.